June 14, 1955   W. F. STEAGALL   2,710,952
RING COUNTER UTILIZING MAGNETIC AMPLIFIERS
Filed May 12, 1954   2 Sheets-Sheet 1
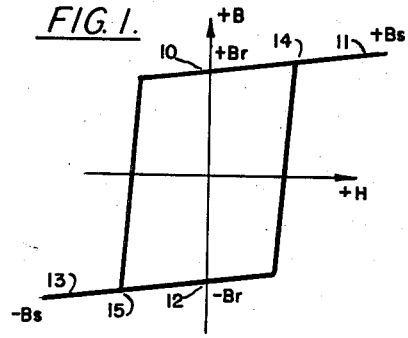
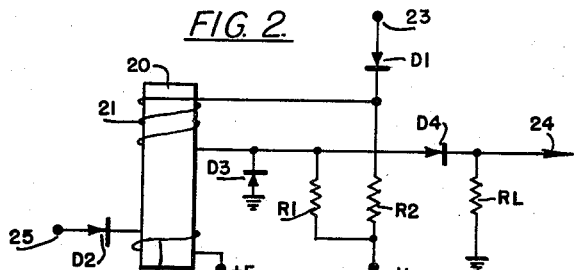
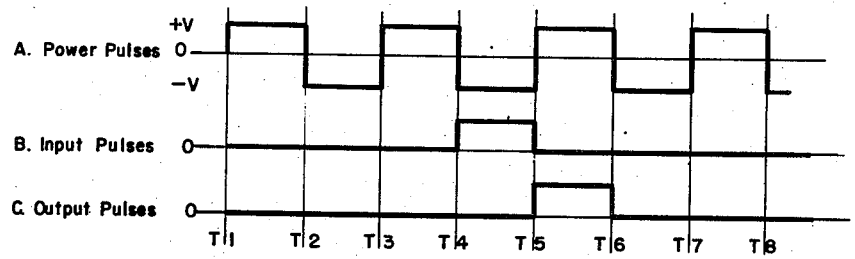
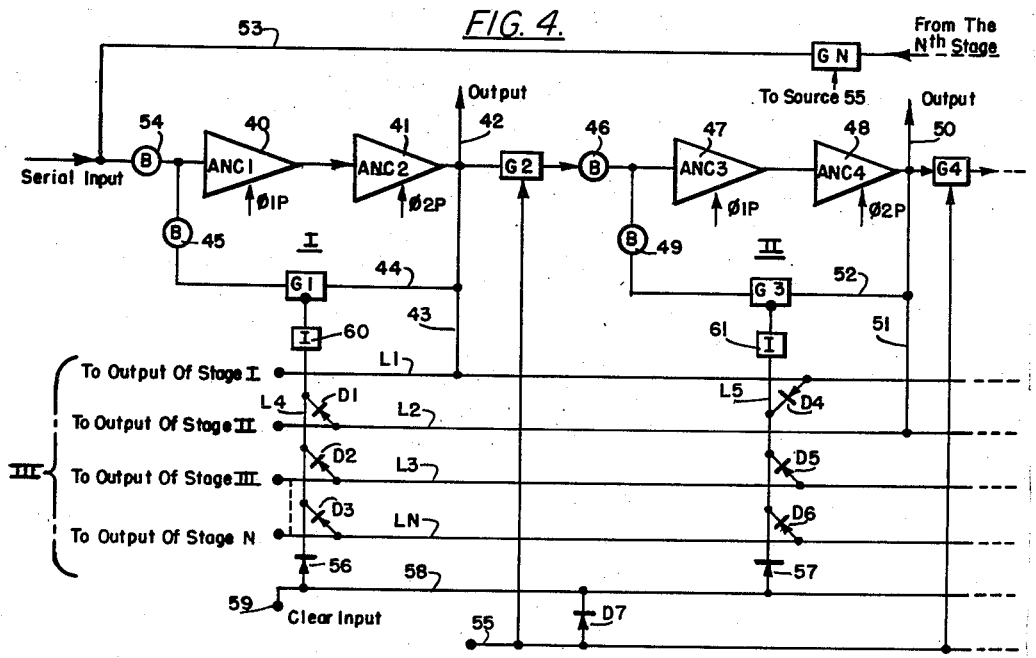
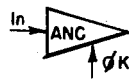
INVENTOR.
WILLIAM F. STEAGALL
BY
ATTORNEY June 14, 1955  W. F. STEAGALL  2,710,952
RING COUNTER UTILIZING MAGNETIC AMPLIFIERS
Filed May 12, 1954  2 Sheets-Sheet 2
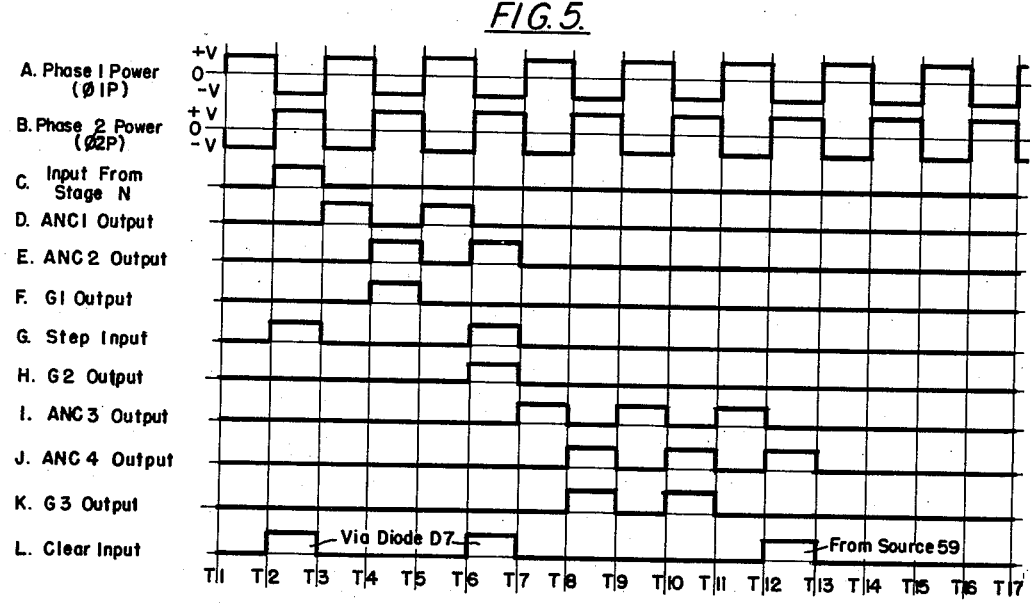
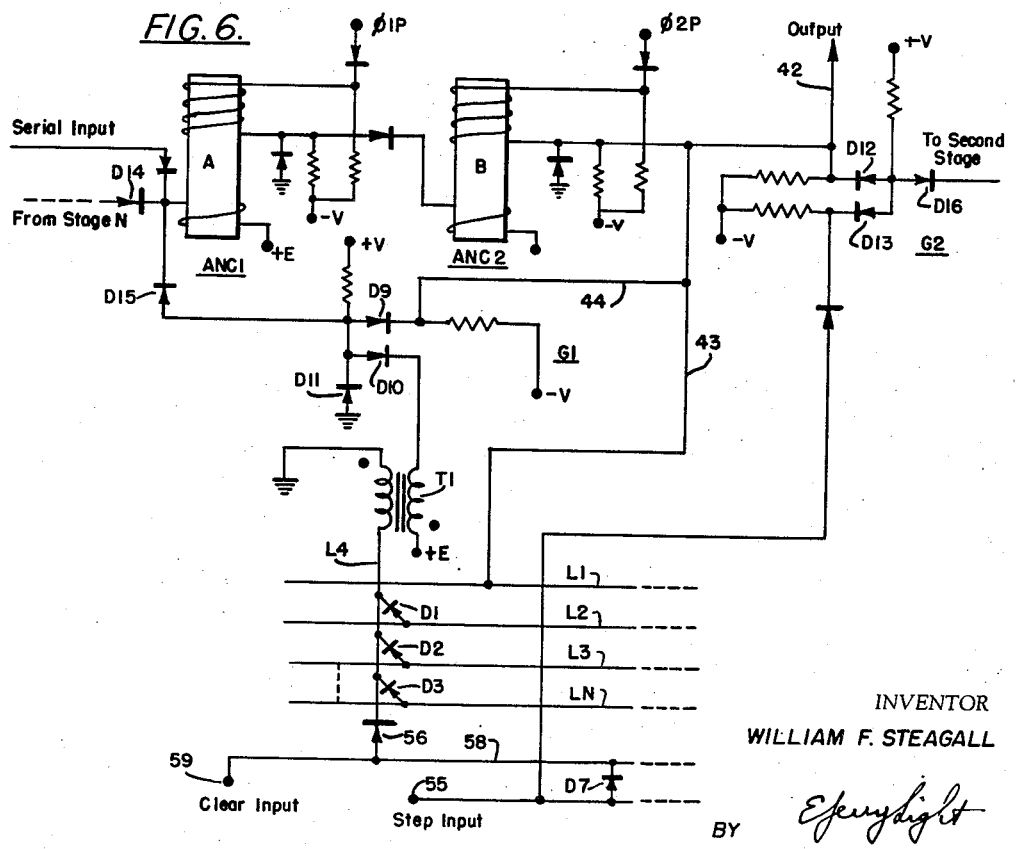
INVENTOR
WILLIAM F. STEAGALL
BY
ATTORNEY

2,710,952

RING COUNTER UTILIZING MAGNETIC AMPLIFIERS

William F. Steagall, Merchantville, N. J., assignor to Remington Rand Inc., Philadelphia, Pa., a corporation of Delaware Application May 12, 1954, Serial No. 429,275

18 Claims. (Cl. 340—167)

The present invention relates to ring counters and is more particularly concerned with such devices employing magnetic amplifiers. The ring counter comprises a basic component in many present-day computing apparatuses. The operation of such a ring counter and the purposes thereof, for instance, are described in the book, "High Speed Computing Devices," by the staff of Engineering Research Associates, Inc., published by McGraw-Hill Book Company, Inc. (1950). Such description is to be found, for instance, at pages 20 through 23, and 293 to 294 of the foregoing text. In the past such ring counters have normally utilized vacuum tube circuitry in the construction of the several bistable stages comprising the counter, and the use of such circuitry has been accompanied by the disadvantage that the ring counter was relatively large in size and was subject to breakage and to normal operating failures.

These foregoing factors raised serious questions of disposition of components as well as of maintenance and the cost attendant thereto. In order to reduce failures due to the foregoing difficulties, other forms of electrical devices have been suggested for use in ring counters, and one such other form is the magnetic amplifier. It is with this particular type of component that the present invention is primarily concerned.

It is accordingly an object of the present invention to provide a novel ring counter utilizing magnetic amplifiers as a basic component thereof.

A further object of the present invention resides in the provision of a ring counter which is both inexpensive to construct and which exhibits considerable ruggedness.

A still further object of the present invention resides in the provision of a ring counter which can be made in relatively small sizes. In this respect it should be noted that the magnetic amplifiers to be disclosed may be combined with semi-conductor diodes whereby the overall counter can assume an extremely small size.

A still further object of the present invention resides in the provision of a ring counter utilizing a chain of bistable devices comprising magnetic amplifiers. In practice, the chain will comprise a number of such bistable devices and the output of the last bistable device will be passed back to the input of the first of said bistable devices thereby to comprise the ring.

Still another object of the present invention is the provision of a ring counter comprising a plurality of interconnected bistable stages and a function table or diode matrix whereby only one bistable stage of the counter may be in an output producing condition at any given time.

A still further object of the present invention resides in the provision of a ring counter comprising an interconnected ring of bistable stages each of which bistable stages utilizes at least one non-complementing magnetic amplifier, a device providing a delayed feedback from the output to the input of the said magnetic amplifier, and a gating network. In this respect it should be noted that the foregoing delay may be actively provided through the provision of a further magnetic amplifier.

Still another object of the present invention resides in the provision of a ring counter utilizing magnetic amplifiers in conjunction with a control signal network whereby all stages of the said counter may be cleared to zero simultaneously or whereby information may be shifted from one bistable stage to the next succeeding stage as may be desired.

The foregoing objects are achieved in the present invention by the provision of a plurality of bistable devices interconnected to form a ring. In one form of the present invention the bistable devices forming basic components of the ring counter herein, comprise non-complementing magnetic amplifiers having a network utilizing a gate and delay means for selectively feeding back energy from the output of the said non-complementing magnetic amplifier to the input thereof. In this respect it should be noted that a non-complementing magnetic amplifier is by definition one which will give an output only when an input is presented thereto. In the practice of the foregoing form of my invention, I further provide a function table or diode matrix which is coupled, as will be described, to the output of each of the bistable stages whereby when one of the said stages is in fact producing an output, it will inhibit outputs from each of the other stages comprising the ring. The function table is also so disposed that a clear input pulse applied thereto will cause each of the bistable stages to be cleared to zero. The several bistable stages comprising the ring counter of my invention are interconnected through transfer gates and a step pulse input is selectively coupled to each of the said transfer gates whereby if one of the bistable stages is in an output producing condition, the occurrence of a step input will cause an input pulse to be fed to the next bistable stage causing it to in turn commence producing outputs, which outputs are fed back through the said function table to inhibit outputs from the previous bistable stage as well as from all other stages in the counter.

The bistable stages of my invention exhibit two stable states of operation, namely, one in which an information pulse recirculates from the output of the non-complementing amplifier of each stage to the input thereof; and a second stable state in which no such recirculation occurs. A clear input pulse accordingly inhibits outputs from the bistable stages by breaking the recirculation path of each of the said stages preferably by closing a gate in the said recirculation path. Similarly, a step input by causing information to be fed from one bistable stage to a next bistable stage, causes the said further bistable stage to commence producing outputs, which outputs are fed to each of the other bistable stages in the ring to again break the recirculating or feedback paths of each of said other bistable stages.

Before proceeding with a detailed description of my invention, several definitions of the subject matter to be discussed are advisable. The definition of a non-complementing magnetic amplifier has been given previously. The several amplifiers comprising the bistable devices of my ring counter are, as will become apparent from the following description, energized by "power pulses." These pulses are preferably in the form of regularly occurring positive and negative going square waves. In the precise disposition of components, some amplifiers will be fed by "phase 1 power pulses" and this term merely refers to such positive and negative going square waves as timed with respect to an arbitrary datum. Other of the amplifiers will utilize "phase 2 power pulses"; and it is to be understood that this latter term again refers to pulses of the same form as the said phase 1 power pulses timed again with respect to the same arbitrary datum, but wherein the phase 2 power pulses are so timed with respect to the said datum that a positive going portion of a phase 1 pulse will coincide with a negative going portion of a phase 2 pulse, and vice versa. Again, it will become apparent from the following description that the several power pulses cooperate with input pulses to selectively produce an output from the magnetic amplifier concerned. These input pulses must occur during a negative going portion of the corresponding power pulse applied to a given amplifier. And in this respect, therefore, when I speak of a "phase 1 input pulse" it is to be understood that this term refers to an input pulse occurring during a negative going portion of a phase 1 power pulse. Similarly, a "phase 2 input pulse" is one which occurs during a negative going portion of a phase 2 power pulse. A phase 1 input pulse cannot effectively cooperate with a phase 2 power pulse nor can a phase 2 input pulse effectively cooperate with a phase 1 power pulse.

The foregoing objects, advantages and operation of my invention will become more readily apparent from the following description and accompanying drawings, in which:

Figure 1 is an idealized hysteresis loop of a magnetic material which may preferably be employed in the cores of the magnetic amplifiers utilized in my invention.

Figure 2 is a schematic representation of a basic non-complementing amplifier of the magnetic type.

Figure 3 (A, B, and C) are wave forms illustrating the operation of the non-complementing magnetic amplifier shown in Figure 2.

Figure 4 is a logical representation of a ring counter constructed in accordance with my invention and utilizing non-complementing magnetic amplifiers such as have been shown in Figure 2.

Figure 5 (A through L, inclusive) are wave forms illustrating the operation of the ring counter shown in Figure 4; and Figure 6 is a schematic representation of one stage of the ring counter shown in Figure 4.

Referring now to Figure 1, it will be seen that the magnetic amplifiers of my invention preferably, but not necessarily, utilize magnetic cores exhibiting a substantially rectangular hysteresis loop. Such cores may be made of a variety of materials among which are various types of ferrites and various kinds of magnetic tapes, including Orthonik and 4–79 Moly-Permalloy. These materials may be given different heat treatments to effect different desired properties. In addition to the wide variety of materials applicable, the cores of the magnetic amplifiers to be discussed may be constructed in a number of different geometries including both closed and open paths. For example, cup-shaped cores, strips of material, or toroidal cores are possible. It must be emphasized that the present invention is not limited to any specific geometries of the cores nor to any specific materials therefor, and the examples to be given are illustrative only.

In the following description, bar type cores have been utilized for ease of representation and for facility in showing winding directions. The bar type representation may be considered, for instance, as the end view of a toroidal core. Further, the following description refers to the use of materials having substantially rectangular hysteresis loops. This is again for ease of discussion. Neither the precise core configuration nor the precise hysteretic character of the core material is mandatory and many variations will readily suggest themselves to those skilled in the art.

Returning now to the hysteresis loop shown in Figure 1, it will be noted that the curve exhibits several significant points of operation; namely, point 10 (plus Br) which represents a point of plus remanence; the point 11 (plus Bs) which represents plus saturation; the point 12 (—Br) which represents minus remanence; the point 13 (—Bs) which represents minus saturation; and the points 14 and 15 which represent, respectively, the beginnings of the plus saturation region and of the minus saturation region. Discussing for the moment the operation of a device utilizing a core which exhibits a hysteresis loop such as is shown in Figure 1, let us assume that a coil is wound on the said core. If we should initially assume that the core is at the operating point 10 (plus remanence), and if a voltage should be applied to the said coil tending to pass a current through the coil on the core in a direction tending to cause a magnetizing force of plus H, that is in a direction tending to increase the flux in the said core in the same direction, the core will tend to be driven from point 10 (plus Br) to point 11 (plus Bs). During this state of operation there is relatively little flux change in the core and the coil therefore presents a relatively low impedance whereby energy fed to the said coil during this state of operation will pass readily therethrough and may be utilized to effect a usable output. On the other hand, if the core should initially be at the point 12 (—Br) prior to the application of a plus H input pulse, upon application of such a pulse the core will tend to be driven in a counterclockwise direction around the hysteresis loop from the said point 12 (—Br) to the region of point 11 (plus saturation). The voltage level of the input pulse for such a state of operation is preferably so chosen that the core is actually driven only to approximately point 14, that is to the beginning of the plus saturation region rather than to point 11 which represents full saturation. During this latter state of operation, there is a very large flux change through the core and the coil therefore exhibits a relatively high impedance to the applied pulse. As a result substantially all of the energy applied to the coil when the core is initially at —Br will be expended in flipping the core from point 12 to point 14, and thence to point 10, plus Br, and very little of this energy will actually pass through the said coil to give a usable output. Thus, depending upon whether the core is initially at point 10 (plus Br) or at point 12 (—Br), an applied pulse producing a magnetizing force in the plus H direction will be presented respectively with either a low impedance or a high impedance and will effect either a relatively large output or a relatively small output. These considerations are of great value in the construction of magnetic amplifiers such as are utilized in the present invention.

Referring now to Figure 2, and making reference to the wave form diagrams of Figure 3 (A through C), it will be seen that a non-complementing magnetic amplifier in accordance with the present invention utilizes a magnetic core 20 preferably but not necessarily exhibiting a hysteresis loop substantially the same as that shown in Figure 1. The core 20 carries two windings thereon, namely, a power or output winding 21 and a signal or input winding 22. One end of the power winding 21 is coupled through a diode D1, poled as shown, to a terminal 23 of a source of positive and negative going power pulses such as is shown in Figure 3A. For purposes of the following discussion, the power pulses are assumed to have a center value of "0" volts and to exhibit excursions between plus and minus V volts. Assuming now that the device is initially at the —Br point of Figure 1, application of a positive going power pulse during, for instance, the time t1 to t2, at power input terminal 23, will cause a current to flow through the diode D1 to winding 21 and thence through diode D4 and resistor RL to ground. Inasmuch as this energy is for the most part expended in flipping the core from —Br (point 12 of Figure 1) to plus Br (point 10 of Figure 1), only a very small output at best will appear across the load resistor RL. This small output is termed a "sneak output" and is effectively suppressed by the combination of resistor R1 and diode D3 connected as shown. This suppression is effected by so choosing the magnitude of resistor R1 that a current normally flows from ground through the said diode D3 and the resistor R1 to the source of negative potential —V, which current is equal to or greater than that of the sneak pulse current to be suppressed. Because of the operation of diode D3 and resistor R1, therefore, only outputs substantially larger than that of the sneak output may appear at output terminal 24.

Summarizing the foregoing, therefore, during the time $t1$ to $t2$ the applied positive going power pulse merely succeeds in flipping the core from —Br to plus Br, and due to the suppression of diode D3 and resistor R1, no output will appear at terminal 24. During the period, for instance, $t2$ to $t3$, a negative going power pulse is applied at terminal 23 and this applied pulse effectively causes diode D1 to cut off. During this period of time a reverse current flows from ground through diode D3 through winding 21 and thence through resistor R2 to the source of negative potential —V. The value of this current is substantially $$\frac{V}{R2}$$

and R2 is so chosen that the current flow in the reverse direction through coil 21 is sufficient to flip the core during the period $t2$ to $t3$, for instance, from plus Br (point 10 of Figure 1) in a counterclockwise direction to point 15 of Figure 1 and thence to point 12 (—Br). At time $t3$, therefore, the core once more finds itself at the —Br operating point and a further positive going power pulse applied at terminal 23 during the time $t3$ to $t4$ will again merely flip the core to the region of plus Br without effecting any output. Thus, in the absence of any other input signals, the core is regularly flipped between —Br and plus Br and thence back to —Br without there being any output.

If we should now assume that an input pulse, as shown in Figure 3B, should be applied to input terminal 25 during the time period, for instance, $t4$ to $t5$, this input pulse will flow through the winding 22 and will subject the core 20 to a magnetizing force in opposition to that produced by the reverse current flow through winding 21 during this same time period. This opposing magnetizing force results, as will become apparent from an examination of the winding directions shown in Figure 2, inasmuch as the coil 22 is wound in a direction opposite to that of coil 21 on the said core 20. The magnetizing effect of the said reverse current flow through winding 21 is thus effectively nullified and therefore at the end of the $t4$ to $t5$ time period, for instance, the core remains at the operating point plus Br and application of a further positive going power pulse during the time $t5$ to $t6$, for instance, will cause a substantial output to appear across load resistor RL and at output terminal 24. If no further input pulse should be applied during the time $t6$ to $t7$, the reverse current flow through winding 21 will again cause the core to flip back to the —Br point. No output will therefore appear during the time period $t7$ to $t8$, etc. Thus, the arrangement shown in Figure 2 permits an output to appear across resistor RL during the application of a positive going power pulse only if an input had been applied at the terminal 25 during the next preceding negative going power pulse.

One other design consideration should be noted. Current flow through the winding 21 in the absence of other circumstances, establishes flux changes tending to induce voltages in the signal input coil 22. In order to protect the input circuit connected to diode D2 from any interference due to current flowing in the power winding 21, the signal winding 22 is returned to a positive voltage plus E, as shown, which positive voltage is equal and opposite in value to the voltage induced or generated in winding 22 by current flowing in the power winding 21 when reverse current flows through the said winding 21.

The non-complementing amplifier shown in Figure 2 may readily be utilized to form a simple bistable device and such bistable devices may in turn be interconnected to effect a ring counter in accordance with the present invention. One such embodiment of my invention is shown in Figure 4. Figure 4 illustrates two stages only of my ring counter, but it is to be understood that any number of stages may be utilized. One bistable stage I of my ring counter comprises a non-complementing amplifier 40 having its input connected to the input of a further non-complementing amplifier 41. The output of non-complementing amplifier 41 selectively appears at an output line 42 and is also fed via line 43 to a function table or diode matrix, to be described, as well as via line 44 to recirculation gate G–1. The gate G–1 is of a form well known in the prior art, and will be in a normally open condition unless an inhibition pulse input is applied thereto. The output of gate G–1 is fed via a buffer 45 to the input of non-complementing amplifier 40. Non-complementing amplifier 40 is energized by phase 1 power pulses and non-complementing amplifier 41 is energized by phase 2 power pulses.

The output of bistable stage I is also selectively fed via a transfer gate G2 and a buffer 46 to the input of a next bistable stage II. This further bistable stage II is directly analogous to bistable stage I, and comprises again non-complementing magnetic amplifiers 47 and 48, recirculation gate G3, transfer gate G4, and buffer 49. The output of the said bistable stage II again selectively appears at an output line 50 and is also fed (a) via a line 51 to the function table or diode matrix III, (b) via a line 52 to recirculation gate G3, and (c) selectively to the transfer gate G4, which in turn feeds the next succeeding bistable stage. As has been mentioned previously, there may actually be N stages of the type described and the output of the Nth stage is selectively fed via a transfer gate, GN, to a line 53 and buffer 54 back to the input of bistable stage I. Each of the transfer gates G2, G4, etc., is connected to a common line which is in turn fed by a source, 55, of step input pulses.

The specific interconnection of a pair of magnetic amplifiers such as 40 and 41 into a closed recirculating loop through a gate such as G–1 and the further interconnection of such loops into a cascaded arrangement through a transfer gate such as G2 is the invention of Henry W. Kaufmann and is claimed in his application Serial No. 431,509, filed May 21, 1954.

The diode matrix or function table III mentioned previously comprises a plurality of lines L–1, L2, L3, * * * LN, each of which lines is respectively connected as shown to the output of one of the bistable stages. A plurality of further lines L4, L5, etc., are respectively connected at one of their ends through buffers 56, 57, etc., to a common line 58 connected to a source 59, of clear input pulses. The other end of each of the said lines L4, L5, etc., is respectively connected through inverters 60, 61, etc., to an input of the recirculation gates G–1, G3, etc. The matrix comprising the function table III utilizes a plurality of diodes D–1, D2, D3, D4, D5, D6, etc., these diodes D–1 through D6, etc., being so arranged that there is a conductive path afforded by the function table III from the output of any given one of the said bistable stages to the recirculation gate of every other one of said bistable stages. Thus, for instance, assuming that an output appears on line 43 of Figure 4, this output would be coupled via diode D4, line L5, and inverter 61 to the input of recirculation gate G3 in bistable stage II; and by similar diodes to the recirculation gates of every other stage but that of bistable stage I. Similarly, an output appearing on line 51 will be coupled via line L2, diode D–1, line L4, and inverter 60 to recirculation gate G–1. Again, an output appearing on line L3, for instance, will be coupled in the foregoing manner via each of diodes D2 and D5, and lines L4 and L5, to the inputs of recirculation gates G–1, G3, etc. It should further be noted that step input 55 is coupled through a diode D7 to the clear line 58 whereby a step input pulse at 55 in effect acts as both a step and a clear pulse. The ring counter is accordingly stepped by the simultaneous application of step and clear pulses to the several transfer gates and, via D7, to the diode matrix III.

The precise operation of the ring counter shown in Figure 4 will become more readily apparent from an examination of the wave form diagrams shown in Figure 5. Figure 5A represents phase 1 power pulses as applied to the non-complementing amplifiers 40, 47, etc., and Figure 5B represents phase 2 power pulses as applied to non-complementing amplifiers 41, 48, etc. If it should be assumed that there is initially no input via buffer 54 to bistable stage I, no output will appear from the stage I. Let us now assume, however, that an input does in fact appear at the said bistable stage I via buffer 54 during, for instance, the time $t2$ to $t3$ (Figure 5C). This input occurs during a negative going portion of a phase 1 power pulse, and consequently, acts as a phase 1 input to non-complementing amplifier 40. As a result, non-complementing amplifier 40 produces an output pulse during the time $t3$ to $t4$, for instance (Figure 5D). This output from non-complementing amplifier 40 occurs during a negative going portion of a phase 2 power pulse and therefore acts as a phase 2 input to non-complementing amplifier 41, which is in turn energized by phase 2 power pulses. Thus, non-complementing amplifier 41 will produce an output pulse during the time $t4$ to $t5$, for instance (Figure 5E), and this further output pulse is fed via gate G-1 (Figure 5F), and buffer 45 back to the input of non-complementing amplifier 40. Since the pulse (Figure 5F) occurring during the times $t4$ to $t5$ again acts as a phase 1 input pulse to non-complementing amplifier 40, the said non-complementing amplifier 40 will produce a further output pulse during the time $t5$ to $t6$, and this will in turn cause a further output pulse from non-complementing amplifier 41 during the time $t6$ to $t7$ (Figure 5E), etc. Thus, a single input pulse appearing at the input of bistable stage I via buffer 54 has caused the bistable stage I to assume a recirculating condition, which is one of its stable states.

If now, during the time $t6$ to $t7$, for instance, a step input pulse should be applied via line 55, this step input pulse will be coupled to an input of each of the transfer gates G2, G4, etc., and to an input of each of the recirculation gates G1, G3, etc. via diode D7, line 58, buffers 56, 57, etc. Gate G1, for instance, will thus be prevented from producing an output during the time $t6$ to $t7$ and bistable stage I will go to its "0" output stable state. Gate G2 will, on the other hand, produce an output during the time $t6$ to $t7$ (Figure 5H), due to the application of the step input pulse thereto, and the output of gate G2 will be fed via buffer 46 to the input of bistable stage II. Since the output of gate G2 again occurs during a negative going portion of a phase 1 power pulse, it performs precisely the same function as did the original input pulse to bistable stage I via buffer 54, and bistable stage II will thus commence producing outputs which will appear on each of lines 50, 51 and 52. The output of bistable stage II appearing on line 51 is fed via line L2, diode D-1 of the function table III, line L4 and inverter 60 to the input of gate G-1. Thus, during the time $t8$ to $t9$, for instance, recirculation gate G-1 will still be closed and again no output will occur therefrom (Figure 5F). As a result, the recirculating condition of bistable stage I is once more inhibited, this time by the output from bistable stage II, and bistable stage I will remain in its "0" output stable state. Further step input pulses on the line 55 will cause the recirculating condition to be successively shifted to subsequent bistable stages in the ring and each of these subsequent bistable stages, upon assuming a recirculating condition, will pass inhibiting outputs through the function table or diode matrix III to each of the other bistable stages in the ring. Only one bistable stage of the ring counter shown can therefore be in an output producing condition at any given time.

If a clear input pulse should be applied at terminal 59 during a time $t12$ to $t13$, for instance, this clear input pulse will be fed via line 58 and via buffers 56, 57, etc. to each of the recirculation gates in each of the bistable stages. Thus, the application of a clear input pulse will cause any stage of the counter which may be in a recirculating condition, to go to a "0" output condition. It must be understood that the precise form of diode matrix or function table shown is illustrative only, and variations will suggest themselves to those skilled in the art. One such variation, for instance, would be the elimination of the clear input line 58. In this precise modification the step input terminal could be coupled via buffers to each of lines L-1, L2, L3 * * * L-N, whereby the ring counter could be stepped by applying a step input pulse to the terminal 55, which step input pulse would thus be applied to each of the lines L-1, L2, L3, * * * L-N to inhibit each of the recirculation gates G-1, G3, etc. The step input pulse would also open all of the transfer gates G2, G4, etc. and the counter would operate as described previously. It will also be obvious that either of the non-complementing magnetic amplifiers comprising a bistable stage may be replaced by an equivalent delay such as is afforded, for instance, by a passive delay line. This will become apparent from an examination of Figures 5C and D, or Figures 5D and E wherein it is clearly shown that the functioning of either of the magnetic amplifiers is such that an input produces an output during a next succeeding time period. Again, while I have shown the use of non-complementing magnetic amplifiers, a pair of complementing magnetic amplifiers may be substituted for the pair of non-complementing amplifiers in each bistable stage, and the device will still operate substantially as described above. In this respect, it should be noted that a complementing amplifier is, by definition, one which will not give an output when an input is presented thereto, or, on the other hand, one which gives an output when no input has been presented thereto. Complementing magnetic amplifiers in accordance with this definition are discussed, for instance, in the copending applications of Theodore H. Bonn and Robert D. Torrey, Serial No. 402,858; and of John Presper Eckert, Jr. and Theodore H. Bonn, Serial No. 382,180.

Figure 6 represents in schematic form one stage of the ring counter shown in Figure 4, and the figure is presented to illustrate how non-complementing magnetic amplifiers of the type shown in Figure 2 may be interconnected to form the counter of Figure 4. The magnetic amplifier utilizing core A corresponds to non-complementing amplifier 40; while the magnetic amplifier utilizing core B corresponds to non-complementing amplifier 41; diode D7, as well as diodes D-1, D2, and D3 of the function table III shown in Figure 4 have corresponding diodes in the schematic of Figure 6. The inversion function of inverter 60 may be performed, for instance, by a pulse transformer T-1. This inversion is of course necessary inasmuch as the pulse applied from step input 55, from clear input 59, or from the output of a recirculating stage via the function table III serves to close recirculation gates rather than to open them. Diodes D9 and D10, and clamping diode D11 and their associated resistances, comprise the recirculation gate G-1. Similarly the diodes D12, D13 and their associated resistances, comprise the transfer gate G2. Diode D14 corresponds to buffer 54, diode D15 corresponds to buffer 45, and diode D16 corresponds to buffer 46. Subsequent stages of the ring counter will take a similar form and may again be interconnected as shown.

While I have attempted to describe a particular embodiment of my invention, many variations will readily suggest themselves to those skilled in the art. I have already discussed possible variations in the precise form of diode matrix as well as the possible substitution of appropriate delay means for one of the non-complementing amplifiers comprising a given bistable stage. It should further be noted that the non-complementing magnetic amplifiers shown are merely illustrative and these amplifiers, as well as the complementing magnetic amplifiers mentioned previously, may in fact take a number of different forms which are all within the scope of the present invention.

Having thus described my invention, I claim:

1. A ring counter comprising a plurality of pairs of magnetic amplifiers, the output of a first amplifier of each such pair being connected to the input of a second amplifier of each such pair, means forming a feedback loop from the output of the second amplifier of each such pair to the input of the first amplifier of each such pair for selectively recirculating information pulses in said feedback loops, means selectively coupling the output of the second amplifier of each such pair to the input of the first amplifier in another such pair, further feedback means from the output of each such pair to the other amplifier pairs in said plurality of amplifier pairs, and means for selectively breaking said feedback loops and said further feedback means.

2. The ring counter of claim 1 in which each of said feedback loops includes a recirculation gate.

3. A ring counter comprising a plurality of bistable devices, each of said bistable devices including a magnetic amplifier and delay means, means ring-connecting said bistable devices to one another, means for selectively feeding the output of each of said bistable devices to the input of the next succeeding bistable device in said ring, a feedback loop in each of said bistable devices, and control means for selectively breaking each of said feedback loops, said control means including further feedback means from the output of each of said bistable devices to the other bistable devices in said ring.

4. The ring counter of claim 3 in which each of said feedback loops comprises a recirculation gate connected in series between the output and input of each of said bistable devices.

5. The ring counter of claim 4 in which said recirculation gates are normally open, said control means including a source of clear pulses coupled to each of said recirculation gates whereby a clear pulse input from said source will cause each of said feedback loops to be broken.

6. The ring counter of claim 5 in which said further feedback means includes a diode matrix interconnecting the output of each of said bistable devices with the recirculation gates of the other bistable devices in said ring, whereby, when one of said bistable devices is producing a predetermined output, a portion of said output is coupled through said diode matrix to open the feedback loops of the other bistable devices in said ring.

7. The ring counter of claim 6 in which said bistable devices are ring connected through normally closed transfer gates, and a source of step input pulses coupled to each of said transfer gates for selectively opening said transfer gates.

8. The ring counter of claim 7 in which the delay means in said bistable devices comprises a further non-complementing magnetic amplifier.

9. The ring counter of claim 8 in which each of said magnetic amplifiers comprises a core of magnetic material exhibiting a substantially rectangular hysteresis loop, first and second windings on each of said cores, said second winding serving selectively to receive inputs to its corresponding amplifier, a source of regularly occurring power pulses coupled to one end of each of said first windings, and means for selectively taking an output from the other end of each of said first windings.

10. A ring counter comprising a plurality of magnetic amplifier stages, each of said stages including a feedback loop from the output to the input thereof, a plurality of normally closed transfer gates interposed between said stages and interconnecting said stages in a ring, step control means coupled to each of said transfer gates, and further control means coupled between the output of each of said amplifier stages and the feedback loops of the other amplifier stages in said ring whereby an output from one of said stages will cause the feedback loops of the other ones of said stages to be opened.

11. The ring counter of claim 10 in which said feedback loops each include a normally open recirculation gate, said further control means comprising a function table interconnecting the output of each of said magnetic amplifier stages to the recirculation gates coupled to the other ones of said magnetic amplifier stages.

12. The ring counter of claim 11 including a source of clear pulses coupled to said function table whereby a clear pulse input to said function table will pass to every recirculation gate in said ring.

13. The ring counter of claim 12 in which each of said feedback loops includes a further magnetic amplifier for effecting a predetermined delay within said loop.

14. A ring counter comprising a plurality of bistable stages, each of said stages including a magnetic amplifier and feedback means for selectively passing energy from the output to the input of said magnetic amplifier, said feedback means including recirculation gate means and delay means, a plurality of normally closed transfer gates respectively interconnecting said bistable stages in a ring configuration, step pulse control means coupled to each of said transfer gates for selectively opening said transfer gates, and a diode matrix connected to pass outputs occurring from one of said bistable stages to the recirculation gates of the other of said stages.

15. The ring counter of claim 14 in which each of said magnetic amplifiers is a non-complementing magnetic amplifier, each of said delay means comprising a further non-complementing magnetic amplifier.

16. The ring counter of claim 15 including a source of clear pulses so coupled to said diode matrix that a clear pulse input to said matrix is coupled to each of said recirculation gate means.

17. The ring counter of claim 14 in which each of said magnetic amplifiers is a complementing magnetic amplifier, each of said delay means comprising a further complementing magnetic amplifier.

18. The ring counter of claim 14 in which the delay means in at least one of said bistable stages comprises a further magnetic amplifier, each of the magnetic amplifiers in said one of said bistable stages comprising a core of magnetic material exhibiting a substantially rectangular hysteresis loop, first and second windings on each of said cores, said second winding serving respectively to receive inputs to its corresponding amplifier, a first source of power pulses, having a first predetermined phase, coupled to one end of the first winding of one of said amplifiers in said one of said bistable stages, a second source of power pulses, having a second predetermined phase, coupled to one end of the first winding of the other of said amplifiers in said one of said bistable stages, and means for selectively taking an output from the other end of each of said first windings.

No references cited.